3,388,993
METHOD OF SEPARATING METAL CHLORIDES
Hal D. Peterson, Boulder, and James L. Drobnick, Lakewood, Colo., and Stanton B. Smith, Covington, Va., assignors to West Virginia Pulp and Paper Company, New York, N.Y., a corporation of Delaware
No Drawing. Filed Oct. 8, 1963, Ser. No. 314,632
13 Claims. (Cl. 75—68)

This invention relates to a process for the separation of metals by the selective adsorption of metal-chloride vapors by active carbons.

There are currently available large quantities of mineral materials, either in the form of natural occurring ores or as a residue from the extraction of a major metal component from an ore, which contain mixtures of various metal compounds. For example, the mineral scheelite is composed of a mixture of tungsten, iron, molybdenum, manganese and calcium together with smaller amounts of strontium, zirconium, and niobium. Due to the complex mixture of metals present in such ores or residues it has often been found to be difficult to recover a desired metal or metals in high purity forms without complex purification steps.

It is the primary object of this invention to provide a process for selectively separating from one another various metals which may be contained in a material composed of two or more metal compounds.

Other objects will become obvious from the following disclosure.

We have discovered that separation of metal values from a mixture of metal compounds can be achieved by conversion of the metals to their chlorides, volatilization of these chloride compounds to a gaseous state, and passage of these gaseous chlorides through a bed of active carbon maintained at an elevated temperature.

Active carbon is a well known material and numerous methods of preparation are known to the art. The preparation of active carbon involves the removal of hydrocarbons from a porous amorphous carbon material which is usually obtained by the charring of a carbonaceous substance such as coal, wood, peat, leacher or nut shells. Activation is generally accomplished by treatment of the carbon material at elevated temperature with steam, carbon dioxide, oxygen, or a mixture of these agents. As a result of such treatment internal pores are developed within the carbon material. In active carbons the surface area of these pores typically constitutes a major portion of the total surface area, which is in excess of 200 square meters per grams.

Conversion of the metal values contained in the ore or residue, to the chloride or oxychloride, which for the purposes of this invention is included within the term chloride, may be accomplished readily by employing well known methods of the prior art. Thus the metal compounds may be reacted with chlorine, carbon tetrachloride, phosgene, or hydrochloride or mixtures thereof. Preferably such reactions with the metals are conducted in the presence of carbon which reacts with any oxygen present thereby facilitating the formation of the fully chlorinated metal chloride.

Volatilization of these chlorides is readily accomplished by heating to above the boiling points of the chlorides. The heated chloride vapors are then passed through a bed of active carbon which is heated to a temperature above that of the boiling point of the metal chlorides. As the gaseous chlorides pass through the bed of active carbon some of the metals will be more strongly adsorbed than will others. The most strongly adsorbed metal chlorides will tend to be readily adsorbed at the bottom of the active carbon bed and displace others in this area which are less strongly adsorbed. This process of the more strongly adsorbed chlorides displacing the weakly adsorbed chlorides will continue until the most weakly adsorbed chloride will be released from the active carbon and recovered. The adsorbed metal chlorides remaining on the carbon subsequently can be selectively desorbed and collected by passing chlorine, hydrogen chloride, air, carbon tetrachloride, or a mixture thereof through the column at an elevated temperature above that at which the metal chlorides were adsorbed. Metal chlorides remaining on the carbon alternatively may be removed and recovered by leaching the metal chlorides from the carbon with a metal chloride solvent, such as water, aqueous solutions of acids and salts, and low molecular weight alcohols. As the solubilities of the various metal chlorides differ considerably from one another the choice of solvent will necessarily be dependent upon the particular metal chloride or combination of metal chlorides to be leached from the carbon. Suitable solvents are, of course, well known to the art as for example in Seidell's "Solubilities of Inorganic and Metal Organic Compounds."

The degree of separation which can be obtained by the selective adsorption on active carbon is dependent upon the specific metal chlorides in the mixture to be separated and on the temperature of the active carbon bed. From our work it appears that the relative adsorption ability of the various metal chlorides follows the order of the following list. In this list metal chlorides which are volatile enough for use in this invention are arranged in order from those being most strongly adsorbed at the top to those being the most weakly adsorbed at the bottom.

| Metal | Assumed Functioning Chloride Formula | Boiling Point (° C.) of Chloride |
|---|---|---|
| Be | $BeCl_2$ | 520 |
| Bi | $BiCl_3$ | 447 |
| In | $InCl_3$ | 440 |
| Te | $TeCl_4$ | 390 |
| Al | $Al_2Cl_6$ | 182 |
| Fe | $Fe_2Cl_6$ | 321 |
| Ga | $Ga_2Cl_6$ | 220 |
| Hf | $HfCl_4$ | 317 |
| Zr | $ZrCl_4$ | 331 |
| Hg | $HgCl_2$ | 304 |
| Se | $SeCl_4$ | 288 |
| Au | $AuCl_3$ | 265 |
| Ta | $TaCl_5$ | 239 |
| Nb | $NbCl_5$ | 254 |
| Mo | $Mo°Cl_x$ | (?) |
| W | $WOCl_4$ | 227 |
| Sb | $SbCl_3$ | 223 |
| V | $VCl_4$ | 152 |
| Ti | $TiCl_4$ | 136 |
| As | $AsCl_3$ | 130 |
| Sn | $SnCl_4$ | 113 |
| Ge | $GeCl_4$ | 83 |
| B | $BCl_3$ | 18 |

It will be obvious that metal chlorides which differ greatly in these adsorptive characteristics, eg. $BeCl_2$ which is at the top of the list and $SnCl_4$ which is near the bottom, will be easily separated from one another while metal chlorides which have nearly the same adsorption characteristics, eg. $TiCl_4$ and $VCl_4$, will be much more difficult to separate.

The effect of the temperature of the active carbon bed is closely related to the particular metal chlorides employed. In general increasing the temperature of the carbon bed will tend to cause desorption of the less strongly adsorbed chlorides. If the temperature is carried too high, however, the more highly adsorbed chlorides will also become desorbed resulting in a lower degree of separation.

The temperature of the active carbon bed should in any event be maintained between about 100 and 700° C. Below 100° C. there are very few metal chlorides which will not condense thereby eliminating the usefulness of this method. Above 700° C. reactions on the surface of the carbon may begin to occur and interfere significantly with separation.

Active carbons may contain oxygen and trace amounts of various metals which may have detrimental effects upon the separation efficiency. Particularly important is the oxygen, which at the temperatures employed in the carbon bed, may cause conversion of the volatile metal chlorides to non volatile compounds. It has been found that to remove the oxygen and most of the trace metals which might contaminate the desired products, gaseous chlorine may be passed through the carbon at a temperature in excess of 200° C. and preferably about 400° C. Such treatment of the active carbon prior to its use for adsorbing the metal chlorides has, in general, been found to greatly improve the separation efficiency and thus to be an extremely valuable part of the present invention.

The choice of the best active carbon for use in this invention is primarily one of economics based upon the recovery of the adsorbed metal chlorides. Where the adsorbed chlorides are desorbed and recovered and the carbon reused it may be desirable to employ a high density, hard, granular active carbon of high capacity although such carbons are relatively more expensive. In other cases where the adsorbed chlorides do not need to be recovered or where recovery can be accomplished by burning the carbon, an inexpensive lower activity, low density carbon will generally be preferable.

It will be obvious to those skilled in the art that in order to achieve separation of a number of metal chlorides from one another it may be necessary to employ a number of adsorption columns each designed to perform a specific separation. For example to separate iron, aluminum, tin, and titanium it might be necessary to use a first column to separate the aluminum and iron chlorides from the tin and titanium chlorides and to pass each of these two fractions to one or more other columns to separate the individual components therein.

While there are some limited uses for the metal chlorides separated by this invention, the primary value of our process lies in the recovery and separation of metals. Once the metal chlorides have been separated, however, they can easily be converted to the oxide by hydrolyzing the chlorides with steam at an elevated temperature of about 100 to 140° C. The oxides obtained may then be converted to the base metal employing standard smelting operations. As a by-product of the hydrolyzation of the metal chlorides hydrochloric acid is formed which may be recycled and reused where acid pretreatment is desirable prior to chlorination of the metal values.

The practice of this invention is illustrated in the following examples.

Example 1

A synthetic mixture of titanium, vanadium, and aluminum oxides was prepared containing equal weight of the basic metals. This was accomplished by mixing metal oxides together on an oxide weight basis of 1.67 parts of Ti, 1.78 parts of V and 1.89 parts Al. 0.8 gram of this mixture were added to 0.2 gram of carbon black to react with the oxides during chlorination. The oxide and carbon mixture was heated to 600° C. and chlorine passed through at a rate of 50 cc. per minute. The resulting metal chlorides were allowed to pass through a bed of active carbon 13.5 cm. high containing 2.0 grams of an active carbon having a surface area of about 150 square meters/gram. The temperature of the carbon bed was maintained at 200° C. After about 15 minutes the metal oxides had essentially been converted to the chlorides and volatilized. The process was stopped and the oxide residue and the carbon bed analyzed for metal content.

Two additional runs were made using these same procedures except that in each run a different temperature was maintained in the carbon bed. The temperatures employed in these three runs were 250 and 300° C. The results of all three of the runs made were as follows:

| Run No. | Temperature of Carbon Bed, ° C. | Metal Adsorbed on Carbon (as grams of metal oxide/gram of C) | | | Metal oxide adsorbed as percent of metal oxide volatilized | | |
|---|---|---|---|---|---|---|---|
| | | $TiO_2$ | $V_2O_5$ | $Al_2O_3$ | $TiO_2$ | $V_2O_5$ | $Al_2O_3$ |
| 1 | 200 | 0.027 | 0.014 | 0.047 | 31.7 | 16.2 | 33.6 |
| 2 | 250 | 0.015 | 0.022 | 0.046 | 11.0 | 31.0 | 29.3 |
| 3 | 300 | 0.004 | 0.014 | 0.046 | 4.8 | 20.6 | 31.0 |

As will be observed an appreciable separation of the various metals occurred even in this single stage limited operation. For example in Run 3 the original metal composition containing 31.4% $TiO_2$, 33.4% $V_2O_5$, and 35.2% $Al_2O_3$ when volatilized in a ratio of 49.3% $Al_2O_3$, 22.8% $V_2O_5$ and 28.0% $TiO_2$ was separated into two fractions, one of which contained 71.3% $Al_2O_3$, 21.7% $V_2O_5$ and 7.0% $TiO_2$ (on the carbon bed) and the other which contained 37.0% $TiO_2$, 22.2% $V_2O_5$ and 40.8% $Al_2O_3$. Also important to note is the effect of changing the temperature of the carbon bed. For example, increasing the temperature to 300° C. practically eliminated all adsorption of the titanium chloride.

Example 2

The procedure of Example 1 was repeated in this work with the exception that a synthetic ore composed of titanium oxide and tin oxide was employed. As in Example 1 equal amounts of the base metal were used to make up the 0.8 gram sample in oxide form. The results of this run were as follows:

| Temperature of Carbon Bed, ° C. | Metal Adsorbed on Carbon (as grams of $TiO_2$ or $SnO_2$/gram of C) | | Metal oxide adsorbed as percent of metal oxide volatilized | |
|---|---|---|---|---|
| | $TiO_2$ | $SnO_2$ | $TiO_2$ | $SnO_2$ |
| 150 | 0.026 | 0.010 | 21.1 | 13.2 |
| 200 | 0.047 | 0.010 | 33.2 | 13.0 |
| 280 | 0.040 | 0.006 | 35.1 | 8.9 |
| 300 | 0.031 | 0.006 | 23.6 | 8.0 |

Example 3

The procedures of Example 1 were employed in separating a synthetic oxide material containing niobium and tantalum. Results were as follows:

| Temperature of Carbon Bed | Weight Ratio of Metal Volatilized ($Ta_2O_5/Nb_2O_5$) | Weight Ratio of Metal Adsorbed by Carbon ($Ta_2O_5/Nb_2O_5$) |
|---|---|---|
| 275° | 1.52 | 2.06 |
| 300° | 1.32 | 3.42 |
| 325° | 1.35 | 3.24 |
| 350° | 1.39 | 2.85 |

Example 4

The process of Example 1 was repeated employing a synthetic oxide material containing zirconium and hafnium with the following results.

| Temperature of Carbon Bed, ° C. | Weight Ratio of Metal Volatilized ($ZrO_2/HfO_2$) | Weight Ratio of Metal Adsorbed ($ZrO_2/HfO_2$) |
|---|---|---|
| 300 | 84.0 | 31.5 |
| 350 | 88.6 | 28.6 |
| 400 | 94.7 | 23.2 |
| 450 | 87.0 | 16.5 |

This invention is particularly adapted for use in producing high purity metal from ores or residues which contain relatively large quantities of ore metal and much smaller quanatities of other metals. The following examples illustrate the recovery of tungsten from a scheelite ore having the following analysis.

| Constituent: | Percent |
|---|---|
| WO$_3$ | 69.50 |
| Fe | 0.78 |
| Mo | 1.20 |
| Cu | 0.03 |
| Ca | 12.10 |
| Mn | 1.40 |
| CO$_2$ | 0.20 |
| Sr | 0.01 |
| Zr | 0.06 |
| Nb | 0.02 |

Example 5

The scheelite ore was treated with hydrochloric acid to solubilize the calcium values as calcium chloride and simultaneously precipitate the tungsten values as tungstic acid. The calcium chloride solution was removed by filtration and the tungstic acid precipitate calcined at 400° C. This calcined feed contained 91.5% WO$_3$ and 0.57% Mo. 7.5 parts by weight of lamp-black were mixed per 100 parts of calcined material to produce a chlorination feed.

This feed was continuously fed into a chamber heated to 600° C. at a rate of 0.24 gram per minute. A chlorinating agent was continuously passed through the feed in the heated chamber and the resultant metal chloride gases passed through a column of active carbon 20 c. in height.

Fresh active carbon was continuously added to the top of the bed and spent carbon removed from the bottom at a rate of 0.11 gram/min.

Using this same arrangement several runs were made with different chlorinating agents. These were chlorine fed at a rate of 50 cc./min., and carbon tetrachloride fed at 0.5 gram/minute with a carrier gas of (a) air, (b) nitrogen, or (c) carbon dioxide; each fed at a rate of 50 cc./min.

Samples of volatile product after passage through the carbon bed were taken at 30 minute intervals during all runs. These samples were all analyzed for molybdenum and tungsten to determine product purity. The activated carbon bed was also analyzed at the end of each run.

The following table presents the data obtained by analysis of the volatile product.

| | Percent Molybdenum in Product Stream (percent on Mo+WO$_3$ Basis) | | | |
|---|---|---|---|---|
| | CCl$_4$+air | CCl$_4$+N$_2$ | CCl$_4$+CO$_2$ | Cl$_2$ |
| Hours of Operation: | | | | |
| 0.5 | 0.007 | 0.005 | 0.012 | 0.002 |
| 1.0 | 0.010 | 0.002 | 0.001 | 0.001 |
| 1.5 | 0.130 | 0.003 | 0.001 | 0.001 |
| 2.0 | 0.120 | 0.004 | 0.006 | 0.001 |
| 2.5 | 0.250 | 0.002 | 0.006 | 0.001 |
| 3.0 | 1.900 | 0.002 | 0.005 | 0.001 |
| 3.5 | 0.400 | 0.003 | 0.020 | 0.001 |
| 4.0 | | 0.002 | | 0.001 |
| 4.5 | | 0.004 | | 0.001 |

From this data it will readily be seen that oxygen has a severe detrimental effect on separation efficiency and should be excluded.

In all the above cases the quantity of WO$_3$ retained in the active carbon bed was quite small never exceeding 10% of the amount of tungsten chloride volatilized. This indicates the value of this invention in obtaining a high yield of an extremely high purity tungsten product. The extreme high purity is indicated by the following detailed spectrographic analysis of the tungsten product obtained in the run using chlorine.

| Constituent: | Percent |
|---|---|
| Tungsten | 99.9+ |
| Molybdenum | 0.002 |
| Copper | 0.0003 |
| Iron | 0.0070 |
| Chromium | 0.0020 |

Example 6

Using the procedure of Example 5 with chlorine as the chlorinating agent ordinary wood charcoal was tested to determine its utility according to this invention. As will be seen from the following results, wood charcoal is not a satisfactory separating agent.

| | Percent Mo in product passing through carbon bed (percent on Mo+WO$_3$ basis) | |
|---|---|---|
| | Active Carbon | Wood Charcoal |
| Hours of Operation: | | |
| 1.0 | 0.001 | 0.604 |
| 1.5 | 0.001 | 1.120 |
| 2.0 | 0.001 | 1.996 |
| 2.5 | 0.001 | 0.922 |

The following example illustrates the practice of stripping metal values adsorbed on the active carbon by treatment with chlorine and air.

Example 7

A gaseous mixture containing approximately equal quantities by volume of air and chlorine was passed through an active carbon bed which had previously adsorbed 0.0450 gram of molybdenum per gram of carbon. The temperature of the carbon bed during the stripping operation was varied from 300 to 500° C. during three separate runs. The molybdenum content of the carbon in each run was determined after 15 minutes with the following results:

| | Molybdenum remaining on Active Carbon after stripping grams Mo/gram Carbon | Percent Molybdenum removed from Carbon |
|---|---|---|
| Temperature, ° C.: | | |
| 300 | 0.0250 | 44.4 |
| 400 | 0.0163 | 63.7 |
| 500 | 0.0087 | 80.6 |

As indicated by the above data, this invention provides for highly efficient recovery of the metal chlorides adsorbed on the active carbon.

While the present invention has been described in conjunction with several specific examples, it is to be understood that the practice of this invention is not limited to such examples but can be utilized under a wide variety of conditions within the broad concepts set forth hereinabove.

We claim:

1. The method of fractionating a mixture of fully chlorinated metal chlorides of different metals which comprises contacting a gaseous mixture containing at least two metal chlorides of different metals selected from the group consisting of the chlorides of beryllium, bismuth, indium, tellurium, aluminum, iron, gallium, hafnium, zirconium, mercury, selenium, gold, tantalum, niobium, molybdenum, tungsten, antimony, vanadium, titanium, arsensic, tin, germanium, and boron with active carbon maintained at a temperature between about 100 and 700° C. which is above the volatilization temperature of the metal chlorides being fractionated whereby said active carbon selectively adsorbs the chloride of some of the metals in greater relative quantities than the chloride of other metals producing at least two fractions each having a composition of metal chlorides differing from that of the original gaseous mixture of metal chlorides, and recovering at least one of said fractions.

2. The method of claim 1 wherein the active carbon has been treated prior to its contact with said gaseous mixture by contacting the active carbon with gaseous chlorine at a temperature above 200° C.

3. The method of claim 1 wherein the metal chloride fraction adsorbed on the active carbon is stripped from said carbon and recovered.

4. The method of claim 1 wherein the gaseous mixture is substantially free of oxygen.

5. The method of claim 1 wherein the gaseous mixture of metal chlorides is passed through a bed of active carbon, the effluent fraction after passage through said bed is recovered and the metal chloride content of said effluent fraction is converted to the basic metal by hydrolysis of the metal chloride with steam at an elevated temperature and smelting.

6. The method of claim 1 wherein aluminum chloride and vanadium chloride are contained in said gaseous mixture of metal chlorides and are fractionated by preferential retention of the aluminum chloride on the active carbon.

7. The method of claim 1 wherein tantalum chloride and niobium chloride are contained in said gaseous mixture of metal chlorides and are fractionated by the preferential retention of the tantalum chloride on the active carbon.

8. The method of claim 1 wherein zirconium chloride and hafnium chloride are contained in said gaseous mixture of metal chlorides and are fractionated by the preferential retention of hafnium chloride on the active carbon.

9. The method of claim 1 wherein aluminum chloride and titanium chloride are contained in said mixture of metal chlorides and are fractionated by the preferential retention of the aluminum chloride on the active carbon.

10. The method of claim 1 wherein tungsten chloride and molybdenum chloride are contained in said mixture of metal chlorides and are fractionated by the preferential retention of molybdenum chloride on the active carbon.

11. The method of claim 10 wherein the active carbon is maintained at a temperature of between 300–350° C.

12. The method of fractionating metal values from a mixture containing at least two metals selected from the group consisting of beryllium, bismuth, indium, tellurium, aluminum, iron, gallium, hafnium, zirconium, mercury, selenium, gold, tantalum, niobium, molybdenum, tungsten, antimony, vanadium, titanium, arsenic, tin, germanium, and boron which comprises converting the metal values to the fully chlorinated metal chlorides, volatilizing the metal chlorides to a gaseous state, passing the gaseous mixture of metal chlorides containing the chlorides of at least two different metals through a bed of active carbon maintained at a temperature between about 100 and 700° C. which is above the volatilization temperature of the metal chlorides present in the gaseous mixture, whereby said active carbon bed selectively adsorbs the chloride of some of the metals in greater relative quantities than the chloride of other metals producing an effluent fraction which has passed through said bed and an adsorbate fraction adsorbed on said carbon both of which have a composition of metal chlorides differing from that of said gaseous mixture fed to said bed, and collecting the metal chlorides contained in the gaseous effluent fraction and the adsorbate fraction obtained.

13. The method of claim 12 wherein the conversion of the metal values to chlorides is accomplished in the presence of carbon.

References Cited
UNITED STATES PATENTS

| 2,682,930 | 7/1954 | Krchma | 23—87 |
| 2,969,852 | 1/1961 | Jacobson | 23—21 X |
| 3,128,150 | 4/1964 | Brothers | 23—16 X |

FOREIGN PATENTS

| 487,834 | 6/1938 | Great Britain. |

OSCAR R. VERTIZ, *Primary Examiner.*

H. T. CARTER, *Assistant Examiner.*